Dec. 22, 1964     T. BEST     3,162,230
REPAIR PLUG
Original Filed Jan. 10, 1961
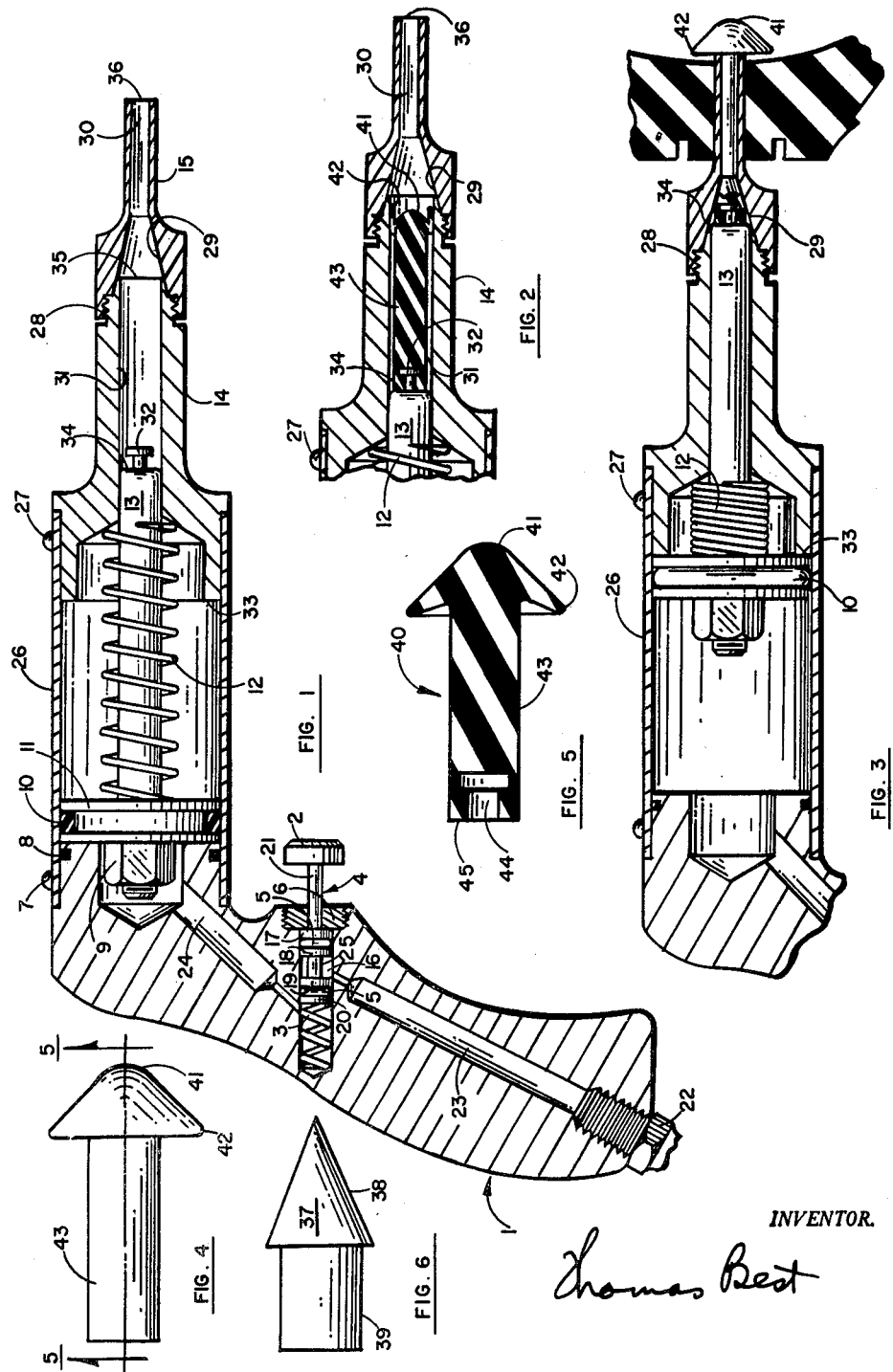
INVENTOR.
Thomas Best

United States Patent Office 3,162,230
Patented Dec. 22, 1964

3,162,230
REPAIR PLUG
Thomas Best, 10310 Tennessee Ave., Los Angeles, Calif.
Original application Jan. 10, 1961, Ser. No. 81,768, now Patent No. 3,083,597, dated Apr. 2, 1963. Divided and this application Jan. 30, 1963, Ser. No. 254,939
3 Claims. (Cl. 152—370)

This invention pertains to an arrangement for repairing punctures in inflatable devices such as tubeless tires and is a division of my co-pending application for United States patent Serial No. 81,768, filed January 10, 1961, for Repair Device, now Patent No. 3,083,597, granted April 2, 1963.

This invention particularly relates to a flanged plug having characteristics that enable it to be useable with a device for placing it in operative position in a tubeless tire without removing the tire from the rim.

It is an object of my invention to provide a flanged plug which is adapted to be placed in a puncture of an inflatable device in such a manner that the flange will engage the interior of the inflatable device and the plug will be received only in the puncture hole into which it expands and completely fills.

It is another object of my invention to provide a plug which is capable of being placed in a tubeless tire by a ram gun under controlled conditions.

It is still another object of my invention to provide a plug having a length and diameter such that its mass or volume is substantially equal to that of the nozzle into which it is compressed for placing in a hole in an inflatable device.

Other objects of my invention will appear in the following description taken in connection with the accompanying drawing, in which:

FIG. 1 is a cross-section showing the ram gun for placing the plug in the tire;

FIG. 2 is a cross-section of the adapter and nozzle with the plug in place for firing;

FIG. 3 shows the plug in the fired position of the gun;

FIG. 4 is an elevation of the plug forming the subject matter of this divisional application;

FIG. 5 is a cross-section of the plug taken along the line 5—5 of FIG. 4; and

FIG. 6 is an elevation of a molded plastic part for facilitating placing the plug in the puncture hole.

Referring now to the drawing, the plug forming the subject matter of this invention is referred to generally as 40 and is provided with a head 41 having a flange portion 42 and a stem portion 43. In the base 45 of the stem portion there is provided a recess or opening 44 adapted to releasably engage flanged nipple 32 on piston rod 13 of the gun used to place the plug in place in a puncture hole. It will be noted in FIG. 5 particularly that the recess or opening 44 is of a larger diameter at its most inwardly location in the stem to facilitate engagement with the flanged nipple 32.

It has been found that plugs of different lengths and diameters will function with the same nozzle of a given gun as long as the mass of the plug remains substantially the same. For instance, a short plug of relatively large diameter will give equally satisfactory results as a somewhat longer plug of less diameter. Accordingly, the dimensions and mass of the material in the plug are coordinated with the diameter and length of the nozzle 15 of the gun and the passageway 30 thereof that the volume of the stem between the flange and recess is substantially that of the nozzle.

The gun for placing the plug in position comprises a handle 1 provided with a trigger 2 slidably received in opening 16 in handle 1. Trigger 2 is provided with flanges 17, 18, 19 and 20 forming with the stem 21 a valve 4 which is held in the forward position in opening 16 by spring 3. The handle 1 is provided with an opening 22 adapted to be connected to a source of compressed air or other gas. Opening 22 leads to passageway 23 which is connected to passageway 24 upon pressing trigger 2 to bring the portion 25 of stem 21 in such position as to connect passageways 23 and 24. O-rings 5 are provided between flanges 17 and 18 as well as between 19 and 20 to seal against leakage of air from the valve piston. Trigger member 2 and valve piston 4 are retained in the handle of the gun by a retainer member 6. Attached to the handle is a cylinder 26 adapted to be fastened thereto by any suitable manner such as by bonding or by way of a screw member 7. A sealing member 8 may be provided if so desired. Attached to the other end of cylinder member 26 is an adapter 14 which is connected to the cylinder 26 by a suitable screw 27. A nozzle 15 is attached by screw threads 28 to the front end of the adapter. This nozzle is provided with a tapered portion 29 and a passageway 30. Slidably received within cylinder 26 is a piston member 11 provided with an O-ring sealing means 10. Piston rod 13 is attached to piston 11 by nut 9. Rod 13 is slidably received in passageway 31 of adapter 14. Piston rod 13 is provided at its forward end with a flanged nipple 32 for a purpose to be hereinafter more fully described. A spring 12 is placed interiorly of cylinder 26 and around piston rod 13 to hold it normally in a rearward position as shows in FIG. 1. The adapter 14 is provided at its rear end with a stop member 33 for limiting forward movement of piston 11 and likewise piston rod 13. The piston rod 13 is made of such length that when piston 11 is against stop 33 the forward end 34 of the piston rod is located adjacent the end 35 of adapter 14. The end 34 is rounded so that it may protrude slightly beyond end 35 into tapered passageway 29.

To facilitate inserting nozzle 15 into the puncture hole of the tire there is provided a molded plastic member 37 having a tapered portion 38 and a cylindrical portion 39 adapted to be received in passageway 30 of nozzle 15.

In the operation of the device, nozzle 15 is unscrewed from adapter 14 and plug 40 is placed into adapter 14. Stem 43 of plug 40 is of slightly less diameter than the diameter 31 of adapter 14. The tip 36 of nozzle 15 is pressed against the head 41 of plug 40 and forces the plug into the adapter until recess 44 engages flanged nipple 32 of piston 13, and base 45 of stem 43 seats against face 34 of rod 13. When the plug is so placed in the adapter recess the flange 42 is inverted and faces forwardly as shown in FIG. 2. Nozzle 15 is then attached to adapter 14.

Plastic member 37 is inserted into the opening 30 at tip 36 of nozzle 15. When the puncture is to be repaired it is first reamed out in the usual manner and cement applied into the hole by means of a reamer or in some other manner well known in the art. Thereupon nozzle 15 is pushed into the puncture opening so that tip 36 is interiorly of the tire casing. Trigger 2 is then moved to permit air under pressure to pass through the passageways 23 and 24 to force piston 11 forwardly together with rod 13 to force plug 40 through passageway 30 of nozzle 15. Ram 13 continues until the forward portion 34 thereof is located slightly beyond the end 35 of adapter 14 at which time the outer portion of the rubber stem 43 which surrounds nipple 32 engages sloping portion 29 of nozzle 15 and restrains the rear portion of stem 43. Plug 40 is compressed in passageway 30 and the momentum given to the plug by the forward motion of the rod carries it forwardly until the edge of rim 42 emerges from the tip 36 of the nozzle. The rim 42 thereupon umbrellas outwardly until only the head 41 and flange 42 have emerged from the end 36 of the nozzle 15.

Upon firing the gun there is first a compression force on the plug to force it into passageway 30. Momentum is built up as the piston and plug move forwardly to a point where the rear end of the plug is confined in the sloping passageway 29 as shown in FIG. 3, thereby arresting the forward motion of the rearward portion of the plug. The forward portion of the plug, however, continues its forward motion until the flange 42 just emerges from the tip 36 of nozzle 15, the stem being elongated, such elongation taking place after its initial compression and during its forward motion.

Upon release of trigger 2 the air is vented and spring 12 retracts piston 11 to its position in FIG. 1. A withdrawing force is then exerted upon the gun to withdraw nozzle 15 from the puncture hole. The interior of flange 32 is thereby drawn into engagement with the interior of the tire and as the nozzle 15 is withdrawn from the tire the plug stem 43 expands and entirely fills the cavity of the puncture hole.

It may be noted that the nozzle 15 must be of sufficient length to extend into the interior of the tire. Otherwise its length is not critical except as being coordinated with the other parts as hereinbefore described to provide an arrangement whereby only the head 41 and the flange 43 extend from the end 36 of the nozzle upon firing of the gun.

Although the invention has been described and illustrated in detail, it is to be clearly understood that the same is by way of illustration and example only and is not to be taken by way of limitation, the spirit and scope of this invention being limited only by the terms of the appended claims.

I claim:
1. A flexible resilient repair plug having an elongated stem, a head at one end of said stem having a laterally extending flange and a recess at the other end of said stem, said recess being of a given diameter at one end of said stem and of a larger diameter at its most inwardly location in said stem.

2. A flexible resilient repair plug adapted for placement in a hole in an inflatable article, a nozzle into which said plug is adapted to be compressed, said nozzle being adapted to be placed through the hole in the inflatable member and then withdrawn from around the plug leaving the plug in the hole, said plug comprising an elongated stem, a head at one end of said stem having a laterally extending flange and a recess at the other end of said stem, the volume of said stem from said recess to said flange being substantially the same as the volume of said nozzle when compressed thereinto.

3. A flexible resilient repair plug adapted for placement in a hole in an inflatable article, a nozzle into which said plug is adapted to be compressed, said nozzle being adapted to be placed through the hole in the inflatable member and then withdrawn from around the plug leaving the plug in the hole, said plug comprising a stem normally of larger diameter than the diameter of said nozzle and of shorter length than said nozzle, a head at one end of said stem having a laterally extending flange and a recess at the other end of said stem, the length and diameter of the portion of said stem between the recess and the flange comprising a volume of material substantially equal to the volume of said nozzle.

References Cited by the Examiner
UNITED STATES PATENTS
1,653,499  12/27  Fisher _____ 152—370 X
2,920,515  1/60  Mays.

ARTHUR L. LA POINT, *Primary Examiner.*